United States Patent

Cezanne et al.

[11] Patent Number: 5,511,464
[45] Date of Patent: Apr. 30, 1996

[54] CUP-SEAL NON-RETURN VALVE

[75] Inventors: Rudolf Cezanne, Hofheim; Peter Gebhardt, Frankfurt am Main; Ralf Jahn, Eschborn; Horst Laczny, Gifhorn, all of Germany

[73] Assignee: ITT Automotive Europe GmbH, Frankfurt, Germany

[21] Appl. No.: 232,200

[22] PCT Filed: Sep. 19, 1992

[86] PCT No.: PCT/EP92/02167

§ 371 Date: Sep. 20, 1994

§ 102(e) Date: Sep. 20, 1994

[87] PCT Pub. No.: WO93/09368

PCT Pub. Date: May 13, 1993

[30] Foreign Application Priority Data

Oct. 31, 1991 [DE] Germany ............ 41 35 867.8

[51] Int. Cl.$^6$ .................................................. F16J 9/00
[52] U.S. Cl. ............... 92/240; 60/591; 137/505.25; 137/508; 277/205; 277/215
[58] Field of Search ............... 60/591; 92/240, 92/245; 137/508, 505.25; 277/205, 215

[56] References Cited

U.S. PATENT DOCUMENTS

| 2,360,577 | 10/1944 | Parrish | 92/240 |
|---|---|---|---|
| 2,465,175 | 3/1949 | Schwarz et al. . | |
| 2,665,151 | 1/1954 | Fisler et al. | 277/215 |
| 3,532,390 | 10/1970 | Bueler | 137/508 |
| 3,680,922 | 8/1972 | Kawai | 137/508 |
| 4,619,287 | 10/1986 | Hama et al. . | |

FOREIGN PATENT DOCUMENTS

| 0271358 | 6/1988 | European Pat. Off. . |
|---|---|---|
| 1298488 | 6/1962 | France . |
| 2070193 | 9/1971 | France . |
| 551152 | 2/1943 | United Kingdom . |
| 1157927 | 7/1969 | United Kingdom . |

Primary Examiner—F. Daniel Lopez
Attorney, Agent, or Firm—Ratner & Prestia

[57] ABSTRACT

In order to protect a cup-seal non-return valve (1) against permanent deformation, it is suggested to provide radial supporting walls (15) between the cylindrical inner wall (10)* (*translator's note: the correct reference numeral is '14') and the sealing lip (13). Preferably, three supporting walls (15), roughly 1 mm thick, are provided because both the natural stability and the valve function are safeguarded this way.

21 Claims, 1 Drawing Sheet

CUP-SEAL NON-RETURN VALVE

The present invention is based on a cup-seal non-return valve according to the preamble of the main claim.

Usually such cup-seal non-return valves abut with their inner wall sealingly in an annular groove of a piston which they seal with their sealing lip in relation to an encompassing bore wall. Once pressure is built up from the open end of the V-profile, the sealing lip presses tighter against the bore wall. In case pressure build-up is effected from the closed end of the V-profile, the sealing lip lifts from the bore wall, bears against the inner wall of the cup-seal non-return valve and establishes a pressure fluid passage in this direction. This represents a low-cost space-saving alternative compared to spherical-seat-type non-return valves. However, especially in designs with a very low opening pressure, it may happen that the sealing lip remains stuck on the inner wall, collapses under the effect of pressure or is deformed permanently in any other way.

Therefore, it is an object of the present invention to provide a cup-seal non-return valve of the above kind which functions in a durable and reliable manner.

This object is achieved by the features of the characterizing portion of the main claim. Further, the radial supporting walls permit the sealing lip to at least partly lift from the bore wall, yet they prevent that it sticks to the inner wall and exert a small but sufficient restoring force on the sealing lip. Collapsing of the sealing lip is successfully prevented as well.

Three supporting walls spread over the periphery prove to be particularly favourable. On the one hand, their distances are large enough to keep the initial pressure of the cup-seal non-return valve low. On the other hand, they are small enough to have a stabilizing effect over the entire periphery.

Especially as regards pressure-reducing valves which e.g. operate as brake force control valves and in which cup-seal non-return valves of the above type are frequently used in order to ensure a quick reduction of the rear-wheel braking pressure when braking is terminated, cup-seal non-return valves according to the present invention contribute to enhancing the durability to a major extent.

An exact explanation of the idea of this invention will follow by way of the description of two illustrations.

In the drawing,

FIG. 1 is a segment of a pressure-reducing valve in which an inventive cup-seal non-return valve is mounted, FIG. 2 is a top view of a cup-seal non-return valve according to the present invention.

In FIG. 1 the cup-seal non-return valve 1 is fitted into the pressure-reducing valve 2 between the inlet chamber 3 and the outlet chamber 4. It embraces in an annular groove the stepped control piston 5, the open end of the cup-seal non-return valve 1 facing the inlet chamber 3, while the closed end thereof faces the outlet chamber 4.

The control piston 5 is guided in the bore 6, the large effective control piston radius R being disposed between inlet chamber and outlet chamber 3 and 4, respectively, while the small effective control piston radius r projects in a sealed manner through the stationary sleeve 7 into a chamber devoid of pressure fluid.

When the pressure-reducing valve is unpressurized, the control piston 5 is in its initial position in abutment on the front wall 8 confining the bore 6 so that the tappet 9 lifts the valve closure member 10 from the valve seat 11 as is shown in the upper half of the illustration.

When the pressure rises from the inlet chamber 3, the control piston 5 starts to move in opposition to the compression spring 12 in the presence of a change-over pressure which is determined by the difference of the pressurized surfaces, on the one hand, and the spring rate of the compression spring 12, on the other hand. The valve closure member 10 moves to sealingly rest on the valve seat 11, as is shown in the bottom half of the illustration. With the pressure continuing to rise in the inlet chamber 3, the pressure rise in the outlet chamber 4 is reduced proportionally.

When finally pressure is decreased in the inlet chamber 3, the cup-seal non-return valve 1 establishes an additional pressure fluid passage from the outlet chamber 4 to the inlet chamber 3 by lifting the sealing lip 13 from the wall of the bore 6. This is important because the control piston cannot return to its basic position as long as the force of pressurization on the outlet side exceeds the force of the compression spring 12. That is to say, the discharge of pressure fluid takes place through the valve 10/11, which acts as a non-return valve in this position of the control piston, and through the cup-seal non-return valve 1 so that the pressure in the outlet chamber 4 quickly adapts to that in the inlet chamber 3 and the control piston moves into its initial position again.

The cup-seal non-return valve 1 itself has a cylindrical inner wall 14 which over its surface is in constant sealing abutment on the control piston 5.

Connected with this wall at an axial end is the sealing lip 13 which transversely projects outwardly so that a V-shaped profile results. At the open end of the V-profile the cylindrical inner wall 14 projects axially beyond the sealing lip 13. In the unpressurized condition the sealing lip 13 fits closely to the wall of the bore 6 encompassing it. According to FIG. 2, three radial supporting walls 15 are spread over the periphery between inner wall 14 and sealing lip 13. They extend no farther than the sealing lip 13 in axial direction.

The following dimensions were chosen in this embodiment: the thickness of the inner wall 14 and of the sealing lip 13 is roughly 0.5 mms, while the total diameter of the cup-seal non-return valve 1 is in the magnitude of 1 cm. The supporting walls 15 are approximately 1 mm thick, that means, roughly twice as thick as the sealing lip 13.

Owing to this dimensioning, sufficient rigidity is imparted to them in order to stabilize the cup seal's shape, while nevertheless they are soft enough to not inhibit the passage of pressure fluid. The entire cup-seal non-return valve 1 is of one-part design.

List of Reference Numerals cup-seal non-return valve
pressure-reducing valve
inlet chamber
outlet chamber
control piston
bore
sleeve
front wall
tappet
valve closure member
valve seat
compression spring
sealing lip
inner wall
supporting walls

We claim:

1. A cup-seal non-return valve for pressure-fluid-operated piston assemblies which is manufactured in one part of elastomeric material, comprising a cylindrical inner wall and a circumferential sealing lip connected thereto which together form a profile of V-type configuration, characterized in that a plurality of radial supporting walls made of the same material are arranged between said inner wall and said sealing lip and are distanced from each other to permit said sealing lip to move towards said inner wall when a sufficient pressure of pressure fluid is applied to a closed end of said V-type configuration.

2. A cup-seal non-return valve as claimed in claim 1, characterized in that three supporting walls are arranged between said inner wall and said sealing.

3. A cup-seal non-return valve as claimed in claim 2, characterized in that the supporting walls each are one and a half to three times as thick as the sealing lip.

4. A cup-seal non-return valve as claimed in claim 3, characterized in that the cylindrical inner wall at an open end of the V-profile projects beyond the sealing lip and the supporting walls.

5. A cup-seal non-return valve as claimed in claim 2, characterized in that the cylindrical inner wall at an open end of the V-profile projects beyond the sealing lip and the supporting walls.

6. A cup-seal non-return valve as claimed in claim 1, characterized in that the cylindrical inner wall at an open end of the V-profile projects beyond the sealing lip and the supporting walls.

7. A cup-seal non-return valve as claimed in claim 1 characterized in that it is used in a pressure-reducing valve.

8. A cup-seal non-return valve for pressure-fluid operated piston assemblies comprising:
   a cylindrical inner wall having first and second ends;
   a sealing lip angularly connected to said cylindrical inner wall at said first end of said cylindrical inner wall to form a V-shape with said cylindrical inner wall; and
   a plurality of supporting walls arranged between said cylindrical inner wall and said sealing lip and distanced from each other to permit said sealing lip to move towards said cylindrical inner wall when a sufficient pressure of pressure fluid is applied to the outside surface of said sealing lip.

9. A cup-seal non-return valve as recited in claim 8 wherein three supporting walls are arranged between said cylindrical inner wall and said sealing lip.

10. A cup-seal non-return valve as recited in claim 9 wherein said cup-seal non-return valve is included in a pressure reducing valve.

11. A cup-seal non-return valve as recited in claim 9 wherein said supporting walls each are one and a half to three times as thick as said sealing lip.

12. A cup-seal non-return valve as recited in claim 11 wherein said second end of said cylindrical inner wall extends beyond said sealing lip and said supporting walls.

13. A cup-seal non-return valve as recited in claim 9 wherein said second end of said cylindrical inner wall extends beyond said sealing lip and said supporting walls.

14. A cup-seal non-return valve as recited in claim 8 wherein said supporting walls each are one and a half to three times as thick as said sealing lip.

15. A cup-seal non-return valve as recited in claim 14 wherein said second end of said cylindrical inner wall extends beyond said sealing lip and said supporting walls.

16. A cup-seal non-return valve as recited in claim 8 wherein said cup-seal non-return valve is included in a pressure reducing valve.

17. A cup-seal non-return valve as recited in claim 8 wherein said second end of said cylindrical inner wall extends beyond said sealing lip and said supporting walls.

18. A cup-seal non-return valve as recited in claim 8 wherein said cylindrical inner wall, said sealing lip and said supporting walls are comprised of an elastomeric material.

19. A pressure reducing valve comprising:
   a housing having a cylindrical bore;
   a control piston movable along said cylindrical bore of said housing and having:
     (a) a head with clearance from said cylindrical bore defining first and second chambers in said cylindrical bore, and
     (b) a body;
   a valve, responsive to movement of said control piston, for controlling fluid flow between said first and said second chambers; and
   a cup-seal non-return valve disposed between said piston body and said cylindrical bore and having:
     (a) a cylindrical inner wall positioned against said piston body and having first and second ends,
     (b) a sealing lip angularly connected to said cylindrical inner wall at said first end of said cylindrical inner wall to form a V-shape with said cylindrical inner wall and bearing against said cylindrical bore, and
     (c) a plurality of supporting walls arranged between said cylindrical inner wall and said sealing lip and distanced from each other to permit said sealing lip to move towards said cylindrical inner wall when a sufficient pressure of pressure fluid is applied to the outside surface of said sealing lip.

20. A pressure reducing valve as recited in claim 19 wherein three supporting walls are arranged between said cylindrical inner wall and said sealing lip of said cup-seal non-return valve.

21. A pressure reducing valve as recited in claim 20 wherein said supporting walls of said cup-seal non-return valve each are one and a half to three times as thick as said sealing lip.

* * * * *

UNITED STATES PATENT AND TRADEMARK OFFICE
CERTIFICATE OF CORRECTION

PATENT NO. : 5,511,464

DATED : April 30, 1996

INVENTOR(S) : Cezanne et al

It is certified that error appears in the above-identified patent and that said Letters Patent is hereby corrected as shown below:

Delete the title page and substitute therefore the title page, as per attached.

Delete columns 1-4 and substitute therefore columns 1-4, as per attached.

Signed and Sealed this

Eighteenth Day of March, 1997

*Attest:*

BRUCE LEHMAN

*Attesting Officer*     *Commissioner of Patents and Trademarks*

United States Patent [19]

Cezanne et al.

[11] Patent Number: 5,511,464
[45] Date of Patent: Apr. 30, 1996

[54] CUP-SEAL NON-RETURN VALVE

[75] Inventors: Rudolf Cezanne, Hofheim; Peter Gebhardt, Frankfurt am Main; Ralf Jahn, Eschborn; Horst Laczny, Gifhorn, all of Germany

[73] Assignee: ITT Automotive Europe GmbH, Frankfurt, Germany

[21] Appl. No.: 232,200

[22] PCT Filed: Sep. 19, 1992

[86] PCT No.: PCT/EP92/02167

§ 371 Date: Sep. 20, 1994

§ 102(e) Date: Sep. 20, 1994

[87] PCT Pub. No.: WO93/09368

PCT Pub. Date: May 13, 1993

[30] Foreign Application Priority Data

Oct. 31, 1991 [DE] Germany .................. 41 35 867.8

[51] Int. Cl.$^6$ ............................................. F16J 9/00
[52] U.S. Cl. ............................................. 92/240; 60/591; 137/505.25; 137/508; 277/205; 277/215
[58] Field of Search ................. 60/591; 92/240, 245; 137/508, 505.25; 277/205, 215

[56] References Cited

U.S. PATENT DOCUMENTS

| | | | |
|---|---|---|---|
| 2,360,577 | 10/1944 | Parrish | 92/240 |
| 2,465,175 | 3/1949 | Schwarz et al. | |
| 2,665,151 | 1/1954 | Fisler et al. | 277/215 |
| 3,532,390 | 10/1970 | Bueler | 137/508 |
| 3,680,922 | 8/1972 | Kawai | 137/508 |
| 4,619,287 | 10/1986 | Hama et al. | |

FOREIGN PATENT DOCUMENTS

| | | |
|---|---|---|
| 0271358 | 6/1988 | European Pat. Off. |
| 1298488 | 6/1962 | France |
| 2070193 | 9/1971 | France |
| 551152 | 2/1943 | United Kingdom |
| 1157927 | 7/1969 | United Kingdom |

*Primary Examiner*—F. Daniel Lopez
*Attorney, Agent, or Firm*—Ratner & Prestia

[57] ABSTRACT

In order to protect a cup-seal non-return valve against permanent deformation, a plurality of radial supporting walls are provided between the cylindrical inner wall and the sealing lip. In a preferred embodiment, three supporting walls, roughly 1 mm thick, are provided because both the natural stability and the valve function are safeguarded with such a configuration.

21 Claims, 1 Drawing Sheet

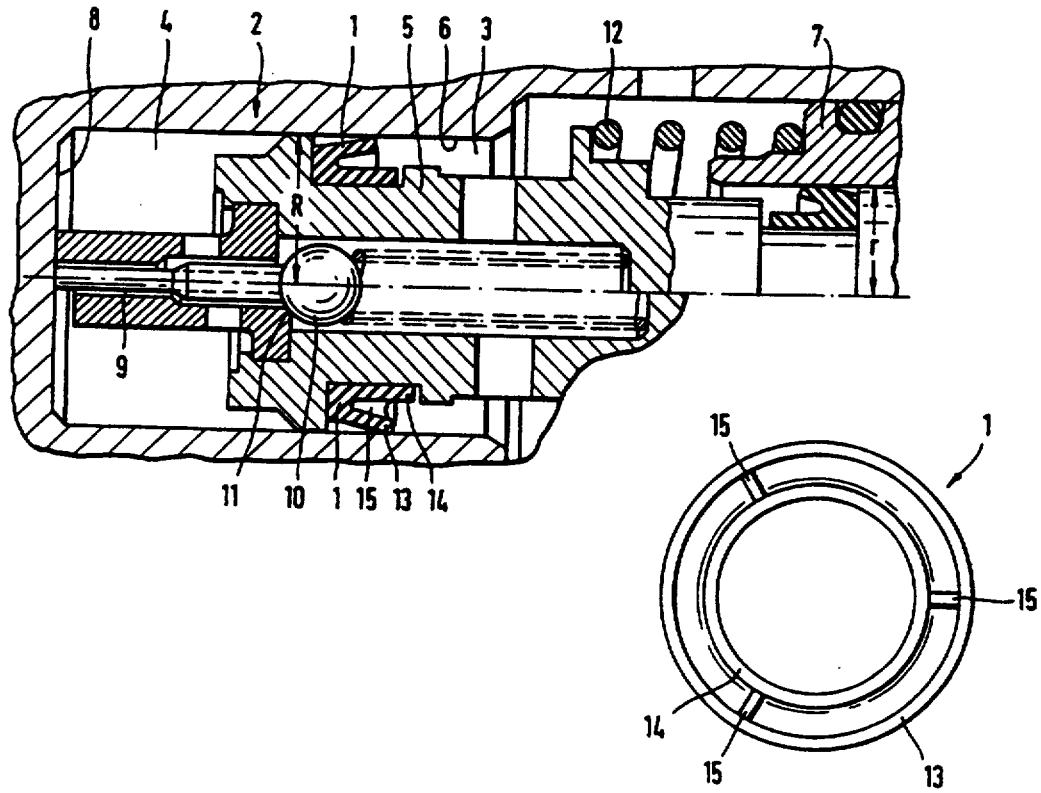

CUP-SEAL NON-RETURN VALVE

BACKGROUND OF THE INVENTION

The present invention relates to a cup-seal non-return valve.

Usually such cup-seal non-return valves abut with their inner wall in an annular groove of a piston to form a seal with their sealing lip in relation to an encompassing bore wall. Once pressure is built up from the open end of the V-profile, the sealing lip presses tighter against the bore wall. When there is a pressure build-up from the closed end of the V-profile, the sealing lip lifts from the bore wall, bears against the inner wall of the cup-seal non-return valve and establishes a pressure fluid passage in this direction. This represents a low-cost, space-saving alternative, when compared to spherical-seat-type non-return valves. However, especially in designs with a very low opening pressure, the sealing lip can remain stuck on the inner wall, collapse under the effect of pressure or deform permanently in another way.

SUMMARY OF THE INVENTION

Therefore, it is an object of the present invention to provide a cup-seal non-return valve of the above kind which functions in a durable and reliable manner.

This object is achieved by a plurality of radial supporting walls made of the same elastomeric material as is the remainder of the cup-seal non-return valve and which are arranged between the inner wall of the valve and the sealing lip of the valve. Further, the radial supporting walls permit the sealing lip to at least partly lift from the bore wall, yet they prevent sticking to the inner wall and exert a small but sufficient restoring force on the sealing lip. Collapsing of the sealing lip is successfully prevented as well.

Three supporting walls spread over the periphery prove to be particularly favorable. On the one hand, their distances are large enough to keep the initial pressure of the cup-seal non-return valve low. On the other hand, they are small enough to have a stabilizing effect over the entire periphery.

With respect to pressure-reducing valves which, for example, operate as brake force control valves and in which cup-seal non-return valves of the above type are frequently used in order to ensure a quick reduction of the rear-wheel braking pressure when braking is terminated, cup-seal non-return valves according to the present invention contribute to enhancing durability.

An explanation of this invention will follow by way of the description of two figures.

DETAILED DESCRIPTION OF THE INVENTION

Figure 1:
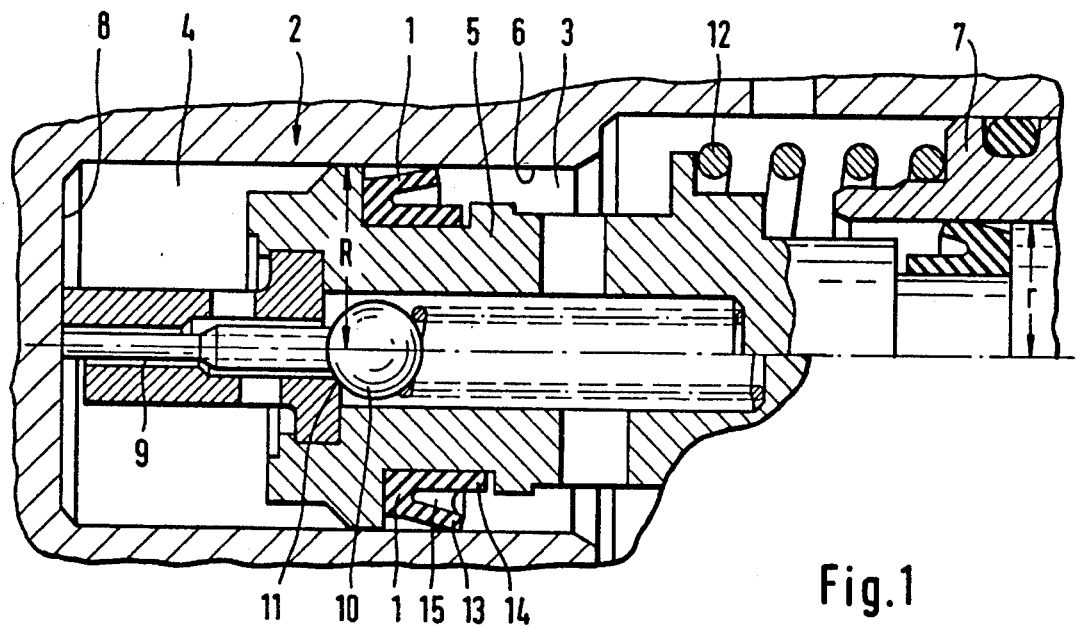
FIG. 1 is a segment of a pressure-reducing valve in which a cup-seal non-return valve in accordance with the present invention is mounted.

In FIG. 1, the cup-seal non-return valve 1 is fitted into the pressure-reducing valve 2 between the inlet chamber 3 and the outlet chamber 4. Valve 1 sits in an annular groove of stepped control piston 5, with the open end of the cup-seal non-return valve 1 facing the inlet chamber 3, and the closed end thereof facing the outlet chamber 4. The control piston 5 moves within the bore 6, with the large, effective control piston radius R being disposed between inlet chamber 3 and outlet chamber 4, while the small effective control piston radius r passes through the stationary sleeve 7 into a sealed chamber devoid of pressure fluid. Fluid can pass through the clearance between the periphery of control piston 5 and the inner wall which defines bore 6.

When the pressure-reducing valve is unpressurized, the control piston 5 is in its initial position against the front wall 8 confining the bore 6 so that the tappet 9 lifts the valve closure member 10 from the valve seat 11 as is shown in the upper half of the FIG. 1.

When the pressure rises in inlet chamber 3, the control piston 5 starts to move in opposition to the compression spring 12 in the presence of a change-over pressure which is determined by the difference of the pressurized chambers, on the one hand, and the spring force of the compression spring 12, on the other hand. The valve closure member 10 moves to sealingly rest on the valve seat 11, as is shown in the bottom half of the FIG. 2. With the pressure continuing to rise in the inlet chamber 3, the pressure rise in the outlet chamber 4 is reduced proportionally.

When finally pressure is decreased in the inlet chamber 3, the cup-seal non-return valve 1 establishes an additional pressure fluid passage from the outlet chamber 4 to the inlet chamber 3 by lifting the sealing lip 13 from the wall of the bore 6. This is important because the control piston cannot return to its basic position as long as the force of pressurization on the outlet side exceeds the force of the compression spring 12. That is to say, the discharge of pressure fluid takes place through the valve 10/11, which acts as a non-return valve in this position of the control piston, and through the cup-seal non-return valve 1 so that the pressure in the outlet chamber 4 quickly adapts to that in the inlet chamber 3 and the control piston moves into its initial position again.

The cup-seal non-return valve 1 itself has a cylindrical inner wall 14 which is in constant sealing contact with the control piston 5.

Connected with this wall 14 at an axial end is the sealing lip 13 which transversely projects outwardly so that a V-shaped profile results. At the open end of the V-profile, the cylindrical inner wall 14 projects axially beyond the sealing lip 13. In the unpressurized condition, the sealing lip 13 fits closely to the wall of the bore 6.

Figure 2:
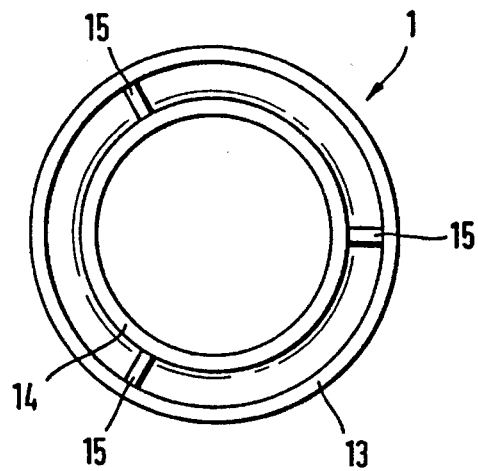
FIG. 2 is a top view of a cup-seal non-return valve according to the present invention.

According to FIG. 2, three radial supporting walls 15 are spread over the periphery between inner wall 14 and sealing lip 13. They extend no further than the sealing lip 13 in axial direction.

The following dimensions were chosen for this embodiment: the thickness of the inner wall 14 and of the sealing lip 13 is roughly 0.5 mm, while the total diameter of the cup-seal non-return valve 1 is in the magnitude of 1 cm. The supporting walls 15 are approximately 1 mm thick, which is, roughly twice as thick as the sealing lip 13.

With these dimensions, sufficient rigidity is maintained to stabilize the shape of the cup seal, while sufficient flexibility is provided so as not to inhibit the passage of pressure or fluid. The entire cup-seal non-return valve 1 is a one piece design made from an elastomeric material.

List of Reference Numerals 1 cup-seal non-return valve
2 pressure-reducing valve
3 inlet chamber
4 outlet chamber
5 control piston
6 bore
7 sleeve
8 front wall
9 tappet
10 valve closure member
11 valve seat
12 compression spring
13 sealing lip
14 inner wall
15 supporting walls

We claim:

1. A cup-seal non-return valve for pressure-fluid-operated piston assemblies which is manufactured in one part of elastomeric material, comprising a cylindrical inner wall and a circumferential sealing lip connected thereto which together form a profile of V-type configuration, characterized in that a plurality of radial supporting walls made of the same material are arranged between said inner wall and said sealing lip and are distanced from each other to permit said sealing lip to move towards said inner wall when a sufficient pressure of pressure fluid is applied to a closed end of said V-type configuration.

2. A cup-seal non-return valve as claimed in claim 1, characterized in that three supporting walls are arranged between said inner wall and said sealing lip.

3. A cup-seal non-return valve as claimed in claim 2, characterized in that the supporting walls each are one and a half to three times as thick as the sealing lip.

4. A cup-seal non-return valve as claimed in claim 3, characterized in that the cylindrical inner wall at an open end of the V-profile projects beyond the sealing lip and the supporting walls.

5. A cup-seal non-return valve as claimed in claim 2, characterized in that the cylindrical inner wall at an open end of the V-profile projects beyond the sealing lip and the supporting walls.

6. A cup-seal non-return valve as claimed in claim 1, characterized in that the cylindrical inner wall at an open end of the V-profile projects beyond the sealing lip and the supporting walls.

7. A cup-seal non-return valve as claimed in claim 1 characterized in that it is used in a pressure-reducing valve.

8. A cup-seal non-return valve for pressure-fluid operated piston assemblies comprising:
 a cylindrical inner wall having first and second ends;
 a sealing lip angularly connected to said cylindrical inner wall at said first end of said cylindrical inner wall to form a V-shape with said cylindrical inner wall; and
 a plurality of supporting walls arranged between said cylindrical inner wall and said sealing lip and distanced from each other to permit said sealing lip to move towards said cylindrical inner wall when a sufficient pressure of pressure fluid is applied to the outside surface of said sealing lip.

9. A cup-seal non-return valve as recited in claim 8 wherein three supporting walls are arranged between said cylindrical inner wall and said sealing lip.

10. A cup-seal non-return valve as recited in claim 9 wherein said cup-seal non-return valve is included in a pressure reducing valve.

11. A cup-seal non-return valve as recited in claim 9 wherein said supporting walls each are one and a half to three times as thick as said sealing lip.

12. A cup-seal non-return valve as recited in claim 11 wherein said second end of said cylindrical inner wall extends beyond said sealing lip and said supporting walls.

13. A cup-seal non-return valve as recited in claim 9 wherein said second end of said cylindrical inner wall extends beyond said sealing lip and said supporting walls.

14. A cup-seal non-return valve as recited in claim 8 wherein said supporting walls each are one and a half to three times as thick as said sealing lip.

15. A cup-seal non-return valve as recited in claim 14 wherein said second end of said cylindrical inner wall extends beyond said sealing lip and said supporting walls.

16. A cup-seal non-return valve as recited in claim 8 wherein said cup-seal non-return valve is included in a pressure reducing valve.

17. A cup-seal non-return valve as recited in claim 8 wherein said second end of said cylindrical inner wall extends beyond said sealing lip and said supporting walls.

18. A cup-seal non-return valve as recited in claim 8 wherein said cylindrical inner wall, said sealing lip and said supporting walls are comprised of an elastomeric material.

19. A pressure reducing valve comprising:
 a housing having a cylindrical bore;
 a control piston movable along said cylindrical bore of said housing and having:
  (a) a head with clearance from said cylindrical bore defining first and second chambers in said cylindrical bore, and
  (b) a body;
 a valve, responsive to movement of said control piston, for controlling fluid flow between said first and said second chambers; and
 a cup-seal non-return valve disposed between said piston body and said cylindrical bore and having:
  (a) a cylindrical inner wall positioned against said piston body and having first and second ends,
  (b) a sealing lip angularly connected to said cylindrical inner wall at said first end of said cylindrical inner wall to form a V-shape with said cylindrical inner wall and bearing against said cylindrical bore, and
  (c) a plurality of supporting walls arranged between said cylindrical inner wall and said sealing lip and distanced from each other to permit said sealing lip to move towards said cylindrical inner wall when a sufficient pressure of pressure fluid is applied to the outside surface of said sealing lip.

20. A pressure reducing valve as recited in claim 19 wherein three supporting walls are arranged between said cylindrical inner wall and said sealing lip of said cup-seal non-return valve.

21. A pressure reducing valve as recited in claim 20 wherein said supporting walls of said cup-seal non-return valve each are one and a half to three times as thick as said sealing lip.

* * * * *